US012272233B2

(12) United States Patent
Kei et al.

(10) Patent No.: US 12,272,233 B2
(45) Date of Patent: Apr. 8, 2025

(54) APPARATUS AND METHOD FOR DETERMINING THE VALIDITY OF AN INFRARED SIGNAL OF A REMOTE-CONTROL DEVICE CROSS-REFERENCE TO RELATED APPLICATIONS

(71) Applicant: Remotec Technology Limited, Kowloon (HK)

(72) Inventors: Cheng Yung Kei, Kowloon (HK); Yau Tai Wai, Kowloon (HK); Lui Kit, Kowloon (HK); Leung Hon Wan, Kowloon (HK); Tse Ho Nin, Kowloon (HK); Ng Ming Lam, Kowloon (HK)

(73) Assignee: Remotec Technology Limited, Kowloon (HK)

( * ) Notice: Subject to any disclaimer, the term of this patent is extended or adjusted under 35 U.S.C. 154(b) by 217 days.

(21) Appl. No.: 18/316,462

(22) Filed: May 12, 2023

(65) Prior Publication Data

US 2023/0368655 A1 Nov. 16, 2023

(30) Foreign Application Priority Data

May 12, 2022 (HK) ........................... 32022053446.7

(51) Int. Cl.
*G08C 19/28* (2006.01)
*G08C 23/04* (2006.01)

(52) U.S. Cl.
CPC ............. *G08C 19/28* (2013.01); *G08C 23/04* (2013.01)

(58) Field of Classification Search
CPC ........... G08C 19/28; G08C 23/04; G01J 1/46; H03K 5/1252; H03K 5/088; H04B 10/114
See application file for complete search history.

(56) References Cited

U.S. PATENT DOCUMENTS 4,313,227 A * 1/1982 Eder ..................... A63F 13/213 340/12.15
4,935,733 A * 6/1990 Munekata ............. G08C 19/28 340/12.22

(Continued)

FOREIGN PATENT DOCUMENTS

CN 101093983 A 12/2007
CN 102005113 A 4/2011

(Continued)

*Primary Examiner* — Adnan Aziz
(74) *Attorney, Agent, or Firm* — Hinckley Allen & Snyder; Stephen Holmes

(57) ABSTRACT

Apparatus and method for determining the validity of an infrared signal of a remote-control device. An infrared signal comprising pulses representing data corresponding to a function of a controllable target device is received from a remote-control device. The received infrared signal is passed through a capacitor of the apparatus such that, for each pulse of the infrared signal, the capacitor is charged and subsequently discharged. The capacitor discharge time associated with each pulse of the infrared signal is measured by a processor of the apparatus to establish a discharge sequence. The processor of the apparatus compares the established discharge sequence with a plurality of pre-determined valid discharge patterns and determine the validity of the received infrared signal based on the outcome of the comparison of the established discharge sequence with the plurality of pre-determined discharge patterns.

14 Claims, 10 Drawing Sheets

(56) References Cited

U.S. PATENT DOCUMENTS

| | | | | |
|---|---|---|---|---|
| 5,414,263 | A * | 5/1995 | Haslam | G01J 1/46 250/342 |
| 6,118,829 | A * | 9/2000 | North | H03F 3/087 375/345 |
| 6,360,090 | B1 * | 3/2002 | Holcombe | H04B 10/114 455/296 |
| 7,759,984 | B2 * | 7/2010 | Takeuchi | H03K 5/1252 327/77 |

FOREIGN PATENT DOCUMENTS

| | | | |
|---|---|---|---|
| CN | 102025413 | A | 4/2011 |
| CN | 202650240 | U | 1/2013 |
| JP | 2019-016960 | A | 1/2019 |
| WO | 2015143807 | | 10/2015 |

* cited by examiner

```
{
     Measurement_1 : {
          time :0,
          3d_xyz : [0,0,0],
          count : [18],
          time : 2.2 ms,
          3d_xyz : [+1,+2,+1],
          count : [39],
          time : 3.3 ms,
          3d_xyz : [+3,+2,0],
          count : [40],
               .
               .
               .
               .
          time : n ms
          3d_xyz : [+4, +2, +1]
          Count : [53]
     }
}
```

```
{
     Pattern_1 : {
          time :0,
          3d_xyz : [0,0,0],
          Count_minmax : [10,30],
          time : 2.2 ms,
          3d_xyz : [+1,+2,+1],
          count_minmax : [22,42],
          time : 3.3 ms,
          3d_xyz : [+3,+2,0],
          count_minmax : [25,45],
               .
               .
               .
          time : n ms,
          3d_xyz : [+4, +2, +1],
          count_minmax : [35,55],
     }
}
```

```
{
  Pattern_1 : {
    time :0ms,
    3d_xyz : [0,0,0],
    count_minmax : [10,30],
    time : 2,2ms,
    3d_xyz : [+1,+2,+1],
    count_minmax : [22,42],
    time : 3.3ms,
    3d_xyz : [+3,+2,0],
    count_minmax : [25,45],
    ....
    }
```

Matchup passed

Matchup failed

Matchup failed

```
{
  Pattern : {
    time :0ms,
    count : [18],

    time : 2.2ms,
    count : [100],

    time : 3.3ms,
    count : [101],
    ....
    }
```

APPARATUS AND METHOD FOR DETERMINING THE VALIDITY OF AN INFRARED SIGNAL OF A REMOTE-CONTROL DEVICE CROSS-REFERENCE TO RELATED APPLICATIONS

BACKGROUND OF THE DISCLOSURE

The present invention relates to an apparatus and method for determining the validity of an infrared signal of a remote-control device.

An infrared (IR) remote-control device for wirelessly controlling an electronic appliance such as a television or air-conditioning unit comprises a plurality of buttons and various electronic components that are configured to generate and transmit an IR control signal to the electronic appliance upon pressing of one of the plurality of buttons. The transmitted IR control signal is encoded with data representing a specific command code that corresponds to the function associated with the pressed button. For example, pressing the volume "up" button of a television remote-control device causes the device to generate and transmit an IR control signal comprising a command code corresponding to the volume up instruction. Thus, when the television receives and decodes the IR signal, the television carries out the instruction to increase the volume.

Each button may be associated with a specific function of the electronic device so that the remote-control device is capable of transmitting multiple different IR control signals, each corresponding to a different function of the receiving electronic appliance.

An IR remote-control device typically comprises an elongate body that houses electronic components including an integrated circuit and near infrared diode. The plurality of buttons extend through a wall of the housing and are arranged, upon pressing of a button, to contact the integrated circuit via corresponding button contacts. When a button is pressed, the remote device uses an encoder to convert a binary signal (representing the function of the pressed button) into a modulated electrical signal which causes the transmitting diode to convert the modulated electrical signal into a modulated IR light signal comprising a series of IR light pulse bursts switched on and off at a high frequency (the carrier frequency).

The receiver diode of the target appliance detects the IR light pulses and permits the passage of IR at the carrier frequency so as to filter out unrelated IR light. The target appliance then amplifies the modulated signal with a pre-amplifier and converts it to a binary signal before sending it to an MCU to identify and implement the requested function.

The pattern in which the modulated IR signal is converted to binary is defined by a transmission protocol which varies by brand. For example, the IR light signal may implement Manchester encoding (used by the Philips® brand) or the more common pulse-distance coding (used by Japanese brands such as NEC® and Sony®).

In the case of a Manchester encoding implemented in the Philips® RC5 protocol, a binary code is achieved by encoding every data bit with a transition from a HIGH to LOW, or LOW to HIGH. A transition from a HIGH to LOW or falling edge may represent a logical "1" and a transition from LOW to HIGH or rising edge may represent a logical "0".

In the case of a pulse-distance coding, the modulated IR signal comprises a series of pulse bursts of specific length each representing a single bit and comprising a HIGH "carrier" pulse and a LOW "no carrier" space. The combined length of the HIGH pulse and LOW space determines whether a single pulse burst represents a logical "1" or logical "0". For example, a logical "1" may correspond to a pulse burst comprising a short HIGH pulse followed by a long LOW space, and a logical "0" may correspond to a pulse burst comprising a short HIGH pulse followed by a short LOW space that is half the time period of a long LOW space.

Many electronic appliances have their own dedicated remote-control device. For example, a television will typically have its own remote-control device and a DVD player or digital set top box may likewise have its own remote-control device. Consequently, there may be several remote-control devices in any one household. This is frustrating and inconvenient for the users because of the need to switch remote-control devices depending on the household appliance to be controlled.

This problem has been largely addressed by universal remote-control devices which are capable of controlling many different types and brands of household electronic appliances. Accordingly, multiple, standalone remote-control devices may be conveniently replaced by the single universal remote-control device.

However, there are no agreed standards for IR codes and their corresponding functions. For example, two brands may have their own bespoke protocols such that the on/off command code of one brand is different from the on/off command code of another brand. This is problematic for a universal remote-control device which is intended to control multiple different devices regardless of the manufacturer.

Universal remote-control device manufacturers have attempted to address this problem by reverse engineering the codes of different brands to build a library of IR codes. This library may be stored in the memory of the universal remote-control device so that the device can identify the correct set of IR codes for a given electronic appliance. The IR code identification process involves first transmitting an IR signal of a specific function from the relevant standalone remote-control device (the "transmitting device") to the universal remote-control device (the "receiving device") for receipt and decoding. Upon receipt and decoding of the IR signal, the receiving device compares the command code of the IR signal with the stored library of IR codes and, if a match is found, identifies the correct protocol required to replicate the IR codes of the transmitting device so that the receiving device can likewise control the corresponding electronic appliance.

Since the IR library may not include all known IR codes and protocols, the receiving device may also be equipped with a learning function, whereby the receiving device can be programmed to store the IR code of a received IR signal in memory and associate that code with a button and a corresponding function of the relevant electronic appliance.

However, a problem with using infrared for wireless communication and control is that the received IR signal can be tainted by noise or noise-like artifacts. This "noise" may be due to background white noise emitted by other IR devices, warm bodies, or sunlight. Alternatively, or additionally, movement of the transmitting device relative to the receiving device during transmission can introduce noise-like artifacts into the IR signal. This creates difficulties in determining whether a received IR signal is valid and can be stored as a command code for subsequent use.

Consequently, a learning procedure by a universal remote-control device should preferably be conducted indoors without direct sunlight and without other IR transmitting devices in proximity, and also with a fixed distance between the transmitting and receiving devices without any relative movement.

In practice, though, users tend to hold one or both devices when implementing the IR learning mode and this inherently leads to unwanted noise or noise-like artifacts in the received IR signal. This creates difficulties in determining whether a received IR signal is a valid signal whose corresponding code may be stored for subsequent performance of the corresponding function by the target appliance.

It is an object of the present invention to mitigate the above identified problems and to improve the ability of a receiving control device to determine the validity of a received IR signal despite the presence of noise or noise like artifacts.

SUMMARY OF THE INVENTION

In accordance with a first aspect of the present invention, there is provided a method of determining the validity of an infrared signal of a remote-control device comprising the steps of:

- receiving from the remote-control device an infrared signal comprising pulses representing data corresponding to a function of a controllable target device;
- passing the received infrared signal through a capacitor such that, for each pulse of the infrared signal, the capacitor is charged and subsequently discharged;
- measuring the capacitor discharge time associated with each pulse of the infrared signal to establish a discharge sequence;
- comparing the established discharge sequence with a plurality of pre-determined valid discharge patterns; and
- determining the validity of the received infrared signal based on the outcome of the comparison of the established discharge sequence with the plurality of pre-determined discharge patterns.

Advantageously, by comparing the discharge sequence associated with the infrared signal with pre-determined discharge patterns it is possible to determine whether the received IR signal is valid and, hence, suitable for storage or locating a code match in a code library for subsequent control of a target electronic device.

The method may further comprise the steps of decoding the infrared signal and storing the decoded data of the infrared signal in memory upon finding a match between the established discharge sequence and a pre-determined valid discharge pattern of the plurality of pre-determined valid discharge patterns.

The method may further comprise the step of prompting a user to retransmit the infrared signal of the remote-control device upon failing to find a match between the discharge sequence and a pre-determined valid discharge pattern of the plurality of pre-determined valid discharge patterns.

The method may further comprise the step of demodulating the infrared signal before passing the infrared signal through the capacitor.

Each pre-determined valid discharge pattern of the plurality of pre-determined valid discharge patterns may comprise a range of valid discharge times corresponding to each pulse of the received infrared signal, and wherein the step of determining the validity of the received infrared signal comprises comparing each discharge time of the established discharge sequence with the range of valid discharge times of the corresponding pulse of each pre-determined valid discharge pattern of the plurality of pre-determined valid discharge patterns.

According to a second aspect of the present invention, there is provided an apparatus for determining the validity of an infrared signal of a remote-control device comprising

- a receiving device for receiving the infrared signal of the remote-control device, the infrared signal comprising a plurality of pulses representing data corresponding to a function of a controllable target device,
- a capacitor for measuring the discharge time associated with each pulse of the infrared signal,
- a processor for establishing a discharge sequence based on the measured discharge times,
- a memory storing a plurality of pre-determined valid discharge patterns,
- wherein the processor is configured to compare the established discharge sequence with each of the plurality of pre-determined valid discharge patterns to determine the validity of the infrared signal.

The processor may be further configured to decode the infrared signal and store the decoded data of the infrared signal in memory upon finding a match between the established discharge sequence and a pre-determined valid discharge pattern of the plurality of pre-determined valid discharge patterns.

The processor may be further configured to prompt a user to retransmit the infrared signal of the remote-control device upon failing to find a match between the discharge sequence and a pre-determined valid discharge pattern of the plurality of pre-determined valid discharge patterns.

The apparatus may further comprise a demodulator configured to demodulate the infrared signal before passing the infrared signal through the capacitor.

According to a third aspect of the present invention, there is provided a method of storing a valid discharge sequence related to an infrared signal transmitted by a remote-control device, the infrared signal comprising a plurality of pulses representing data corresponding to a function of a controllable target device, the method comprising the steps of:

- moving the remote-control device relative to an infrared receiver;
- transmitting the infrared signal from the remote-control device to the infrared receiver to capture each pulse of the infrared signal;
- demodulating the infrared signal;
- passing the demodulated signal through a capacitor such that the capacitor charges and discharges for each pulse of the demodulated signal; and
- measuring the discharge time associated with each pulse of the demodulated signal; and
- storing, in memory, each consecutive discharge time of the demodulated signal as a sequence of discharge times.

The method may further comprise the step of storing one or more additional discharge sequences for the same infrared signal.

The method may further comprise the step of establishing a valid discharge pattern based on the or each stored sequence of discharge times.

A valid discharge pattern may comprise a range of valid discharge times associated with each pulse of the infrared signal.

The method may be repeated for one or more different infrared signals to build a database of valid discharge patterns.

According to a fourth aspect of the present invention, there is provide an apparatus for determining one or more valid discharge sequences associated with an infrared signal comprising a plurality of pulses representing data corresponding to a function of a controllable target device, the apparatus comprising

- a transmitting device for transmitting the infrared signal,
- an infrared receiver for receiving the infrared signal,
- means for producing relative movement between the transmitting device and the infrared receiver,
- a demodulator for demodulating the infrared signal,
- a capacitor for measuring the discharge time corresponding to each pulse of the demodulated infrared signal,
- and a computing device comprising a processor and memory configured to process the demodulated infrared signal and store in memory the discharge time of each pulse as a discharge sequence.

The computing device may be configured to process and store multiple discharge sequences of an infrared signal.

The computing device may be configured to control the means for producing the relative movement to produce a known relative movement pattern between the transmitting device and the infrared receiver.

The apparatus may further comprise means for measuring the distance between the transmitting device and the infrared receiver. The means for measuring the distance may comprise a LiDAR sensor. The computing device may be configured to store the location of the transmitting device for each measured discharge time associated with each pulse of the demodulated infrared signal.

BRIEF DESCRIPTION OF THE DRAWINGS

In order that the invention may be more clearly understood, one embodiment thereof will now be described, by way of example, with reference to the accompanying drawings in which.

DETAILED DESCRIPTION OF THE EXEMPLARY EMBODIMENTS

Figure 1:
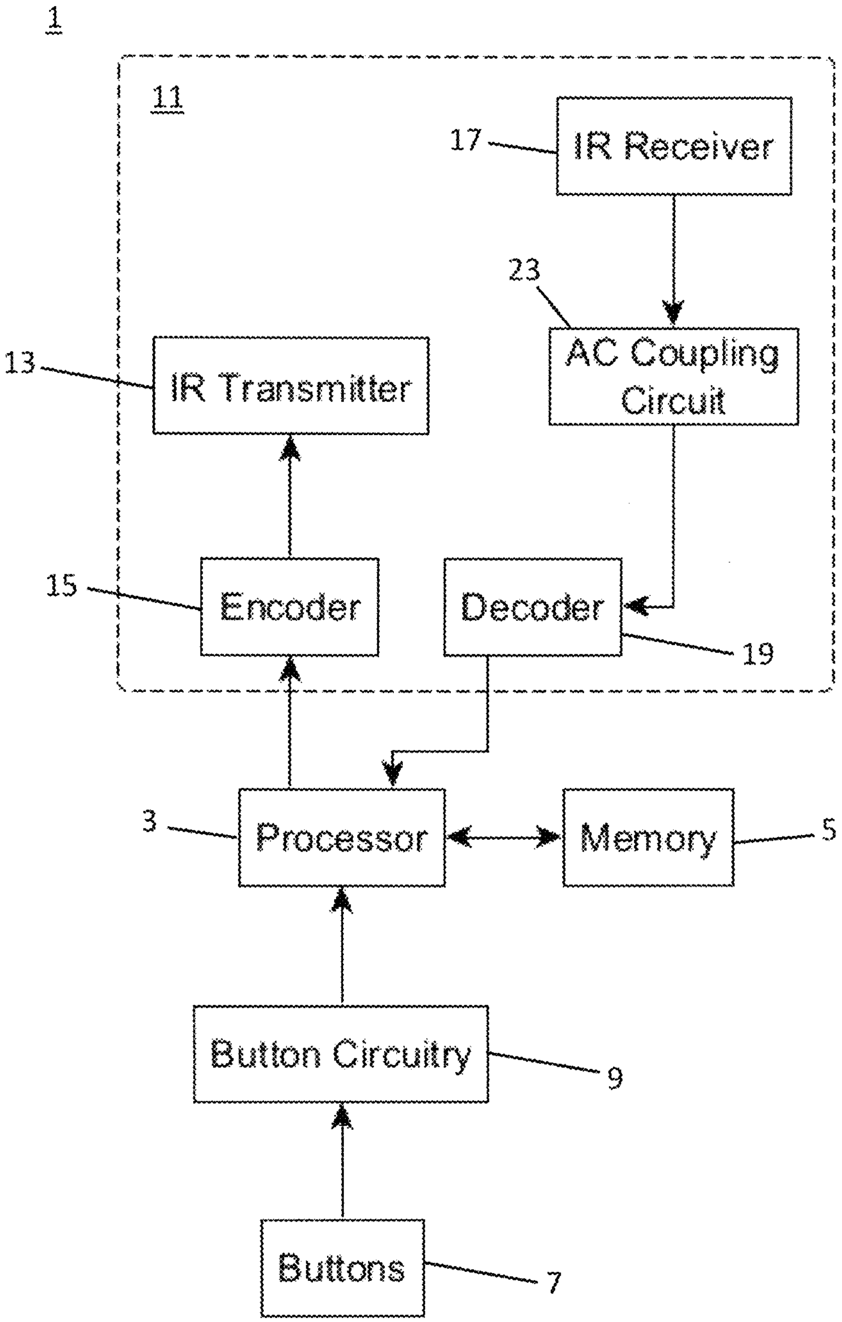
FIG. 1 shows a simplified block diagram of a universal remote-control device of the invention.

Referring to the drawings there is shown a schematic representation of elements of a universal remote-control device 1 that is programmable to transmit wireless command signals in the form of infrared (IR) light to a plurality of different target controllable electronic appliances (not shown) such as a television, DVD player, digital set-top box, or air conditioning unit. The universal remote-control device 1 comprises a processor 3, memory 5, a plurality of buttons 7, and circuitry 9 forming a button matrix in relation to the plurality of buttons 7.

Each of the buttons 7 may be associated with a function of the target controllable device and data of the command code for the desired function may be stored in the memory 5 so that, when a particular button is pressed by a user, the appropriate command code is encoded onto the IR light signal and transmitted to the target device for implementation.

Figure 2:
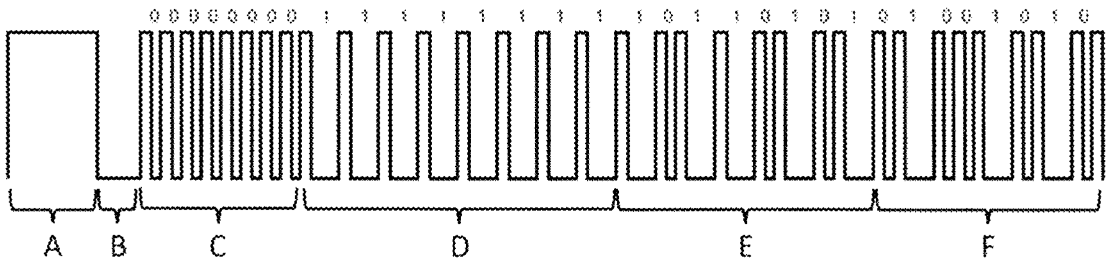
FIG. 2 shows an example IR signal encoded using pulse-distance coding.

Referring to FIG. 2, an example IR signal is encoded with data relating to a particular target device command and comprises an initial 9 ms leading pulse burst A, a 4.5 ms low period B, an 8-bit address of the device C, the logical inverse of the first eight bits D, an 8-bit command E, the logical inverse of the command bits F, and a final 562.5 μs burst (not shown) to signify the end of the message. The logical inverse portions serve as a checksum to verify the validity of the preceding, corresponding portion. Whilst in the present example the IR signal is encoded using pulse-distance coding based on the NEC protocol, it will be appreciated that the IR signal may be encoded using other pulse-based encoding protocols such as the above-described Manchester encoding protocol. When a target appliance receives and decodes the IR signal, it may then implement the function corresponding to the command bits.

To enable wireless communication between devices, the universal remote-control device 1 comprises a wireless communications interface 11 for transmitting and receiving IR signals with the data representing command codes for the target controllable device. The wireless communications interface comprises a diode 13 capable of transmitting data in the form of IR light, an encoder 15 for encoding the IR light with data of a command code, an IR sensor 17 for detecting and receiving wirelessly transmitted IR signals, and a decoder 19 for decoding a received IR signal for subsequent processing by the processor 3.

The memory 5 stores an IR library that comprises multiple sets of commands codes for different brands and appliances. Accordingly, the universal remote-control device 1 may be configured to operate different target appliances by identifying the appropriate set of command codes for a given target device and loading the data set into the working RAM memory of the remote-control device 1 such that the buttons 7 trigger the correct command for subsequent wireless control of the target appliance.

Figure 3:
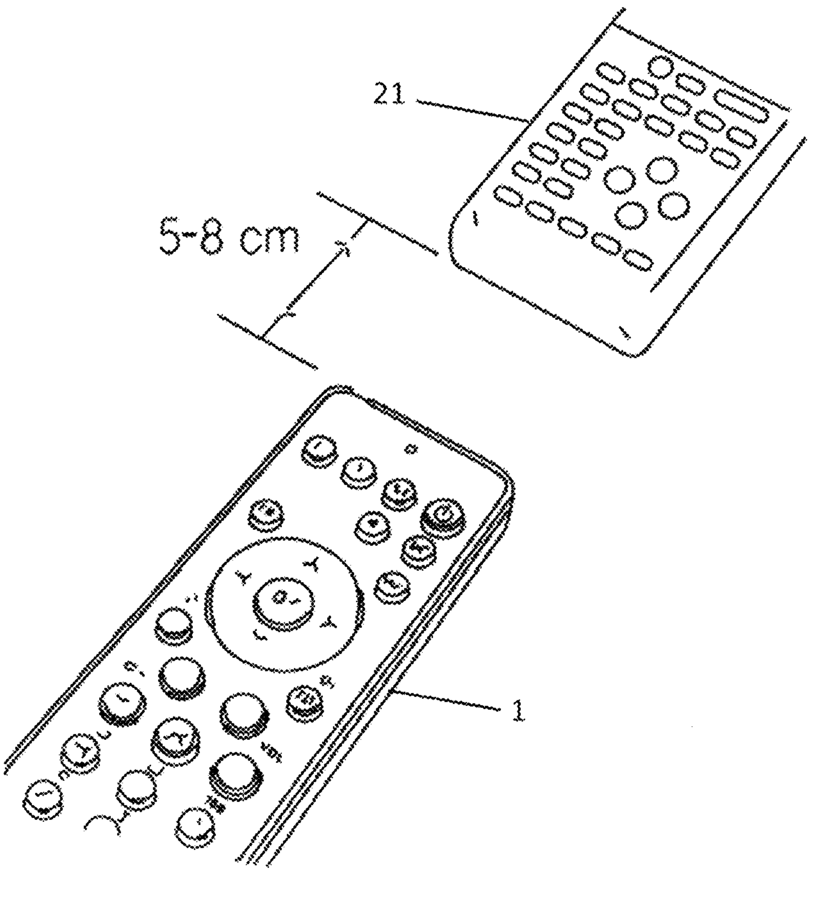
FIG. 3 shows a transmitting controller and a receiving controller (universal remote-control device) during an IR signal capture procedure.

Referring to FIG. 3, the procedure for attempting to identify the correct set of command codes for a specific target appliance preferably requires the positioning of the dedicated remote-control device 21, or "transmitting controller", for the target appliance in close proximity to the universal remote-control device 1 (referred to here as the "receiving controller" for ease of understanding). The transmitting part of the transmitting controller 21 (generally located at the head of the device) is directed toward the receiving part of the receiving controller 1 (likewise generally located at the head of the device) and spaced apart by approximately 5-8 cm to ensure an uninterrupted line of sight. The user activates a code capture function on the receiving controller 1 and presses the on/off button of the transmitting controller 21 to transmit the on/off command to the receiving controller 1. The receiving controller 1 receives and decodes the IR signal and initiates a match routine to attempt to find the corresponding code stored in memory 5. If a match is found, the corresponding set of command codes may then be loaded into the RAM memory of the receiving controller 1 for subsequent operation of the target appliance. If a match is not found, the receiving controller 1 may then be switched to a learning mode in which a user activates each button of the transmitting controller 21 in turn so that the receiving controller 1 can store the command code of each received IR signal in memory 5 and associate each command code with the appropriate button as determined by its corresponding function.

To improve the ability of the receiving controller 1 to determine the validity of a received IR signal and, hence, whether to conduct a match routine or to store the command code as a valid code for subsequent control of the target appliance, the wireless communications interface 11 comprises an AC coupling circuit 23 with a capacitive element coupled to the processor and arranged between the IR sensor 17 and the processor 3 so that the demodulated IR signal and, hence, each pulse of a received IR signal is routed through, and charges, the capacitive element of the AC coupling circuit 23 in sequence. The size of the capacitive element is chosen to be sufficiently small such that the capacitive element has fully discharged between each consecutive pulse. Accordingly, the required size of the capacitive element is determined by the sensitivity of the IR sensor 17 and the transmission power of the IR transmitter of the transmitting controller 21. In the present embodiment the capacitive element is chosen to have a capacitance of 470 pF but could be in the range between 20 pF and 500 pF depending on the aforementioned variables.

Figure 4:
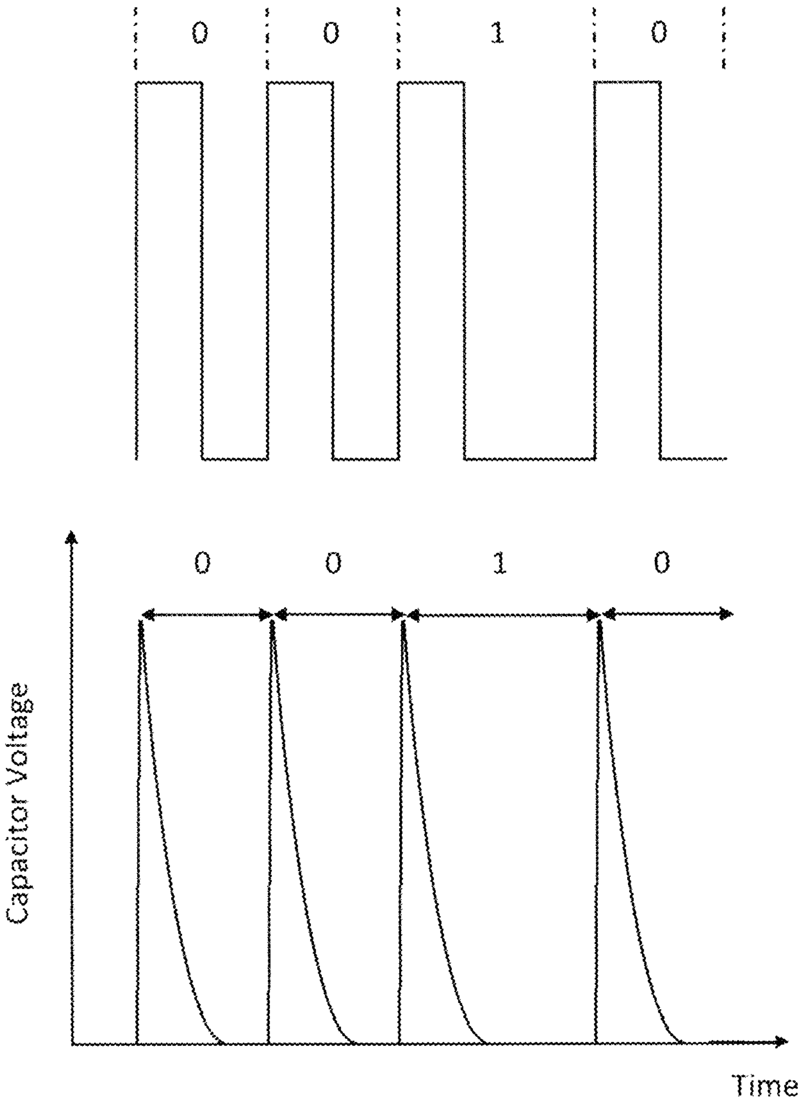
FIG. 4 shows a capacitor discharge chart with multiple charge/discharge cycles and the associated pulse of an IR signal.

The capacitive element of the AC coupling circuit 23 has the effect of removing the DC component of the IR signal, which typically contains the majority of the background noise, and of identifying each discrete binary pulse as a charge/discharge cycle. As shown in FIG. 4, by measuring the time between consecutive charge/discharge cycles, it is possible to determine whether the corresponding pulse is a logical "1" or a logical "0". Therefore, the processor is configured to reconstruct the data of the received IR signal based on the time difference between each pulse and to determine the corresponding command bits for storage and subsequent transmission to a target controllable appliance.

Figure 5:
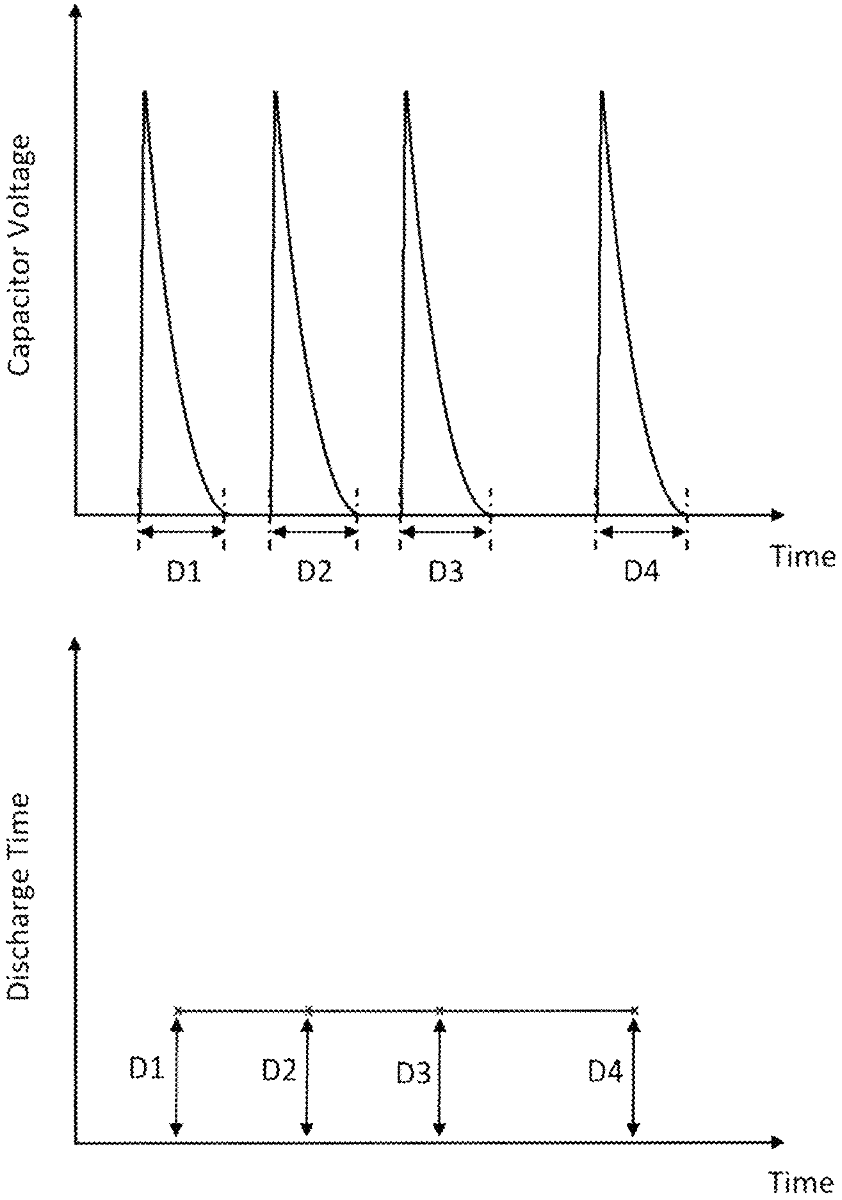
FIG. 5 shows the capacitor discharge chart of FIG. 4 and a corresponding discharge time chart plotting the discharge time associated with each pulse over time when the distance between a transmitting controller and a receiving controller is approximately fixed during the IR signal capture procedure.

When the distance between the transmitting controller 21 and the receiving controller 1 is constant and a good IR signal is received by the receiving controller 1, the charge/discharge cycle associated with each pulse is stable and consistent. Accordingly, the discharge time D1, D2, D3, D4 of the capacitive element for each pulse is substantially the same. Referring to FIG. 5, the discharge time D1, D2, D3, D4 associated with each pulse may be plotted against time to obtain a discharge sequence of the received IR signal. Since, in the present example, the relative spacing between the transmitting controller 21 and receiving controller 1 is substantially fixed during transmission of the IR signal, the corresponding discharge sequence depicted on the chart is substantially horizontal. Accordingly, based on the obtained discharge sequence it is possible for the processor 3 to determine that the received IR signal does not contain noise-like artifacts due to relative movement between the transmitting and receiving controllers and that the received IR signal is valid.

Figure 6:
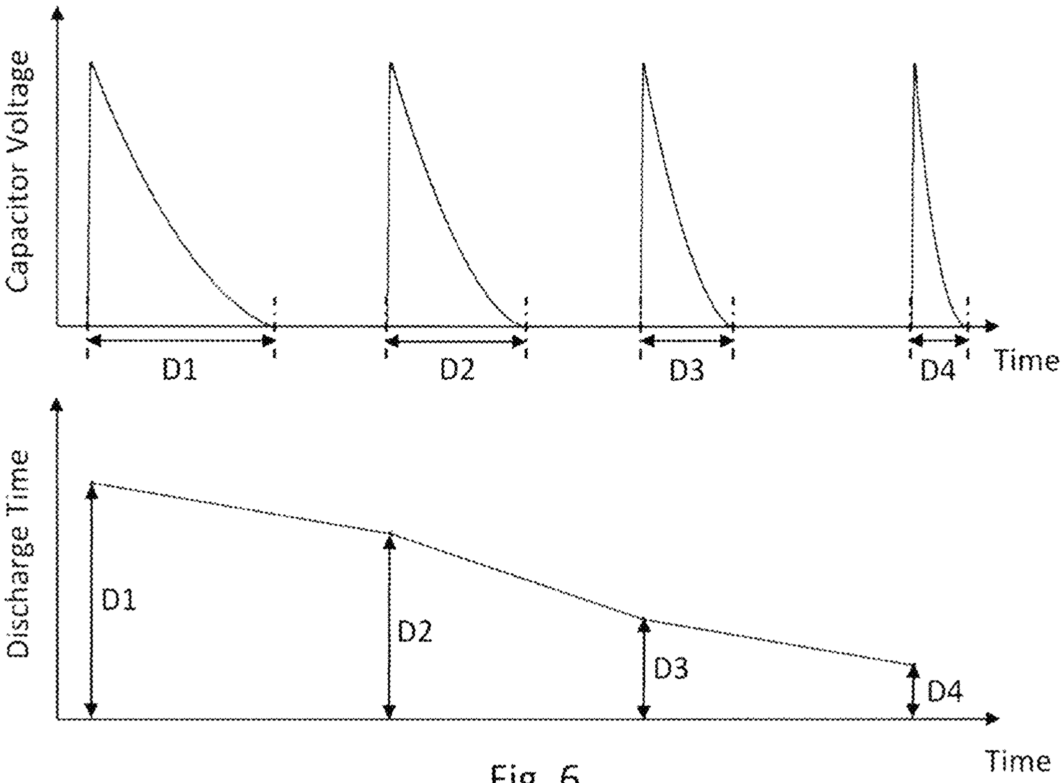
FIG. 6 shows an alternative capacitor discharge chart and a corresponding discharge time chart plotting the discharge time associated with each pulse over time, wherein the two charts represent an increasing distance of separation between the transmitting controller and receiving controller during the IR signal capture procedure.
Figure 7:
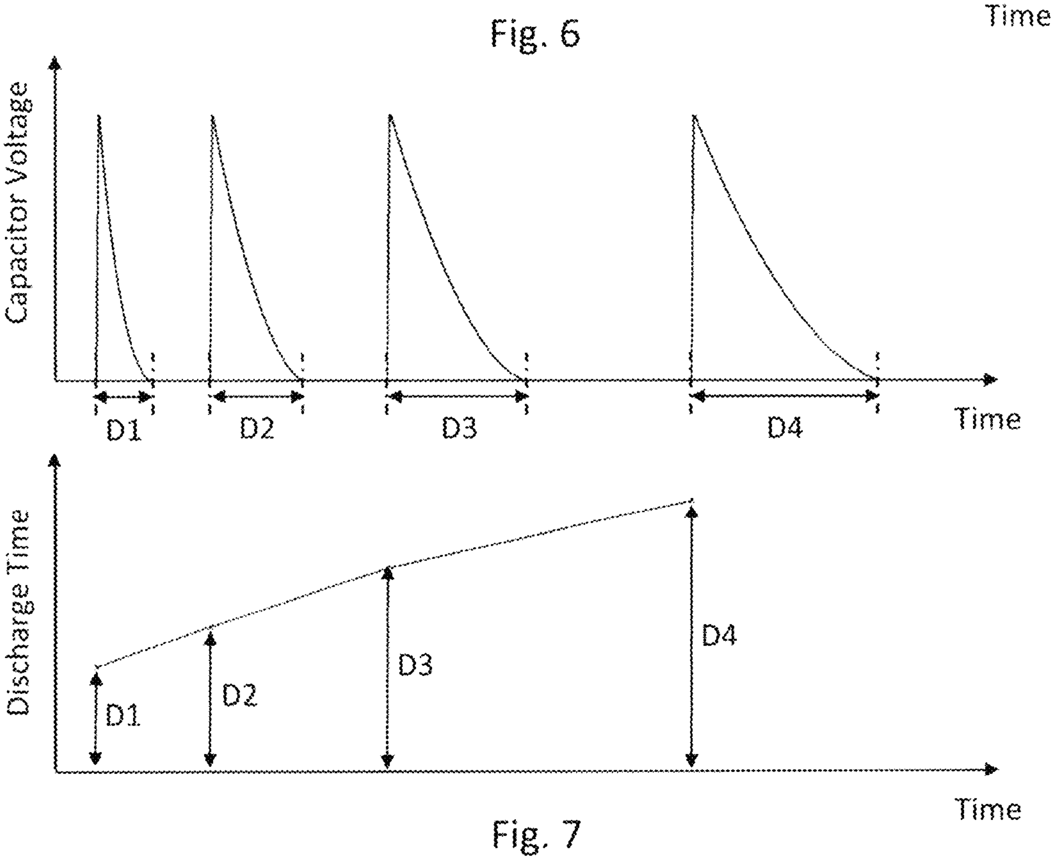
FIG. 7 shows an alternative capacitor discharge chart and a corresponding discharge time chart plotting the discharge time associated with each pulse over time, wherein the two charts represent a decreasing distance of separation between the transmitting controller and receiving controller during the IR signal capture procedure.

Since the IR reception power increases as the distance between the transmitting and receiving controllers decreases, the discharge time of the capacitive element increases as the distance between the transmitting and receiving controllers decreases. Consequently, the charge/discharge cycle associated with each pulse varies with relative separation between the transmitting and receiving controllers.

Where the relative separation between the transmitting and receiving controllers increases during transmission of the IR signal, the charge/discharge cycle for each consecutive pulse decreases. As shown in FIG. 6, plotting the discharge time D1, D2, D3, D4 for consecutive pulses of the received IR signal allows for the establishment of a discharge sequence that can be used to identify the type of relative movement between the transmitting and receiving controllers. In this example, it can be observed that a decreasing slope corresponds to an increasing distance between the transmitting and receiving controllers. Conversely, as shown in FIG. 7, an increasing slope corresponds to a decreasing distance between the transmitting and receiving controllers.

It will be appreciated that different relative movement patterns between the transmitting and receiving controllers will produce different discharge sequences. For example, an increasing slope followed by a decreasing slope or an approximately "n" shaped slope will correspond to an initial decrease in distance followed by an increase in distance between the transmitting and receiving controllers. Conversely, in another example, a decreasing slope followed by an increasing slope or an approximately "u" shaped slope will correspond to an initial increase in distance followed by a decrease in distance between the transmitting and receiving controllers.

By obtaining discharge sequences for different relative movement patterns between the transmitting and receiving controllers, it is possible to build a library of pre-determined discharge patterns that can be used when analysing a received IR signal and establishing its validity for further processing and storage. Accordingly, the receiving controller 1 stores a discharge pattern library in memory 5 to enable the processor 3 to determine whether noise or noise-like artifacts present in the IR signal are due to the relative movement between transmitting and receiving controllers or due to other background noise such as sunlight and/or other nearby IR devices.

The discharge pattern library may be populated with different pre-determined discharge patterns that have been pre-captured in a testing environment. The testing environment may comprise a test jig for securing a test transmitting controller and allowing adjustment of the 3D spatial position of the test transmitting controller relative to an IR receiver. In the present example, the test jig comprises three motors for automatically moving the test transmitting controller in 3D space according to movement commands from a test computing device.

The test jig includes a LiDAR sensor to continuously measure the distance between the test transmitting controller and the IR receiver so that the position of the test transmitting controller relative to the IR receiver can be measured in real-time and fed back to the test computing device. The test transmitting controller is set to transmit with an IR transmission power that is typical for IR remote control devices. The test transmitting controller and test jig are set within an enclosure having walls coloured in grey, black, and white to emulate the IR reflections of a typical room environment. The test computing device is connected to the IR receiver and capacitor and is configured to demodulate the IR signal and measure the capacitor discharge time associated with sequential pulses of the demodulated IR signal.

Figures 8, 9A, 9B:
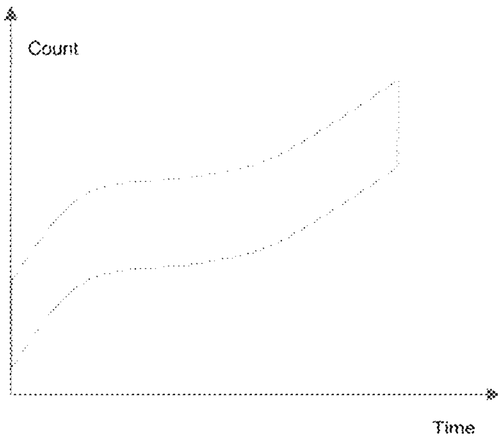
FIG. 8 shows an example of discharge counts of three initial sequential pulses and the $n^{th}$ pulse of a received IR signal measured at different times and 3D coordinates and stored in JSON format.
FIG. 9*a* shows an example of a range of discharge counts of three initial sequential pulses and the $n^{th}$ pulse of a received IR signal measured at different times and 3D coordinates and stored in JSON format.
FIG. 9*b* shows a graphical representation of a discharge pattern including the ranges of the discharge counts of FIG. 9*a;*

Referring to FIG. 8, the analysing computing device is configured to receive the demodulated IR signal, measure the capacitor discharge time associated with each pulse of the demodulated IR signal, and record the discharge times in a key-value pair JSON format from the $1^{st}$ to the $n^{th}$ pulse including the header/preamble. In the present example, the key-value pairs comprise the time at which the capacitor discharge was recorded (with 0 being the time of the first incident pulse), the 3D coordinate of the test transmitting controller as measured by the LiDAR sensor, and the measured discharge count for the given 3D coordinate. A discharge sequence may therefore be captured by the testing environment for a specific button command and stored in memory as a series of discharge counts, each corresponding to a pulse of the IR signal. For example, an IR signal of the on/off command may comprise the bytes 0001111001011010 which may produce a series of discharge counts (measured in ms) for a given relative movement pattern between the test transmitting controller and the IR receiver such as [24, 33, 44, 28, 37, 24, 26, 28, 39, 51, 42, 45, 25, 29, 32, 36].

Accordingly, a first test discharge sequence may be obtained by first positioning the test transmitting controller at a starting 3D coordinate of the test jig i.e., [0, 0, 0]. The test transmitting controller is then activated to transmit an IR signal of a specific command of a target device such as the on/off command. Simultaneously, the test jig is instructed by the test computing device to automatically move the test transmitting controller through different 3D coordinates so that the IR signal is transmitted during relative movement conditions. In the example of FIG. 8, the test transmitting controller is moved from [0, 0, 0] through the 3D coordinates [+1, +2, +1] and [+3, +2, 0] as measured in mm during transmission of the first three pulses of the IR signal and through a further series of 3D coordinates during transmission of the remainder of the IR signal until the final $n^{th}$ pulse at the end coordinate [+4, +2, +1]. Based on the assumption that, in practice, the test transmitting controller moves in 3D space approximately ±1 cm about a starting coordinate during an IR signal capture procedure, the test jig is likewise programmed to move the test transmitting controller through a set of 3D coordinates within approximately ±1 cm about the initial starting coordinate relative to the IR receiver during a test capture procedure.

The analysing computing device receives the demodulated IR signal via the IR receiver and capacitor and measures the discharge time, 3D coordinate, and discharge count for the sequential pulses of the IR signal. Since the command associated with a button is transmitted three times in succession for each button press, the testing environment captures a further two consecutive sequences of discharge counts of the IR signal during further relative movement between the test transmitting controller and the IR receiver. Using the three captured sequences of discharge counts it is possible to construct a pre-determined discharge pattern for the IR signal of a given button command comprising a range of valid discharge counts for each pulse of the IR signal with a count minimum and a count maximum.

Referring to FIGS. 9*a* and 9*b*, a pre-determined discharge pattern for the specified button command is established with upper and lower bounds for valid discharge counts for each pulse of the IR signal. Accordingly, in the present example, a valid discharge count of between 10 and 30 is established for the first pulse at time 0 and 3D coordinate [0, 0, 0], between 22 and 42 for the second pulse at time 2.2 ms and coordinate [1, 2, 1], between 25 and 45 for the third pulse at time 3.3 ms and coordinate [3, 2, 0], and so on for each subsequent pulse until the final $n^{th}$ pulse with a discharge count range of between 35 and 55 at time n ms and coordinate [4, 2, 1].

In the example depicted, the count_minmax for each pulse of an IR signal is established using the lowest discharge count and highest discharge count of the three consecutive IR signals of a given button press. It will be appreciated also that a pre-determined discharge pattern may also be constructed by averaging the discharge count of each common pulse of the three consecutive IR signals of a button press and creating upper and lower bounds by adding, for example, ±5% to the average discharge count associated with each pulse. The established pre-determined discharge pattern for the specified button command may be depicted graphically over time with upper and lower range bounds in the form of a chart as shown in FIG. 9*b*. Accordingly, if a discharge sequence of a received IR signal falls within the bounds of the pre-determined discharge pattern, it can be determined that the received IR signal is valid. Otherwise, if any part of the discharge sequence falls outside a pre-determined discharge pattern, it may be determined as invalid.

By repeating the above process for different button commands across through different relative movement patterns between the transmitting and receiving controllers, it is possible to build a library of valid pre-determined discharge patterns. In the present example, it is deemed sufficient to repeat the test process for a given controller three times with different button commands in order to establish a library with sufficient discharge patterns for IR signal validity matching. However, it will be appreciated that more or less discharge patterns may be captured as desired, but at least three is preferable.

Figure 10:
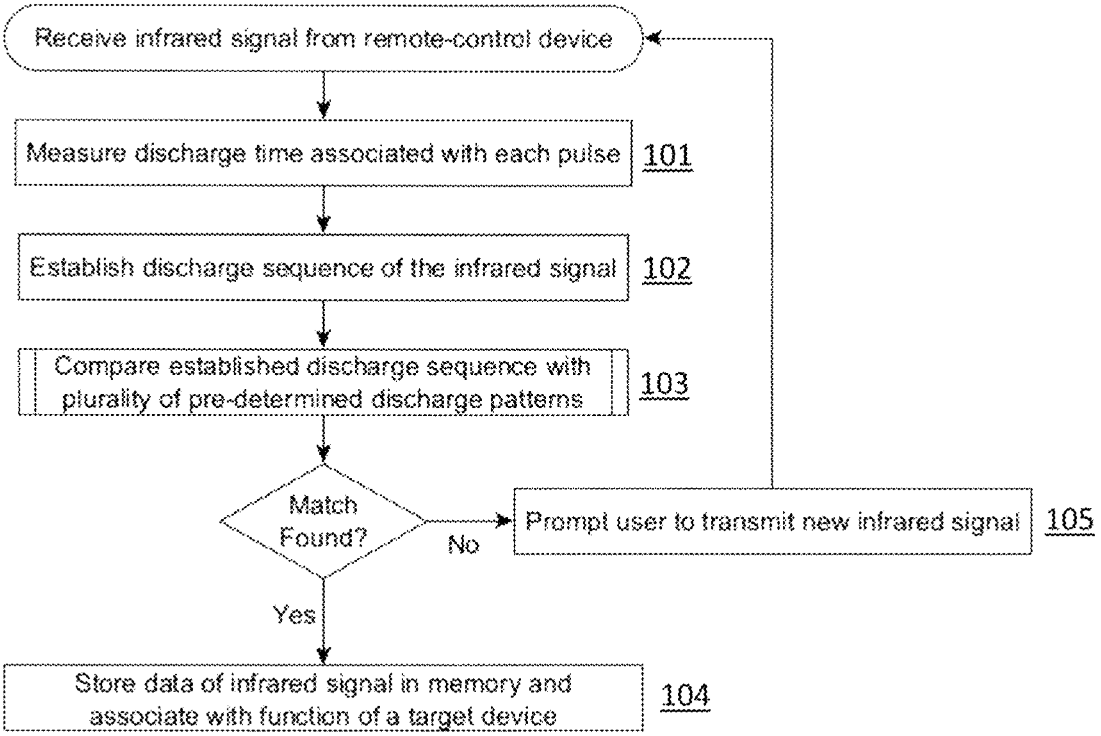
FIG. 10 shows a flowchart illustrating the determination by the receiving controller of the validity of a received IR signal during the IR signal capture procedure.

The library of discharge patterns may be subsequently used when conducting a pattern match routine by the receiving controller to determine the validity of a received IR signal. Referring to FIG. 10, the determination by the receiving controller 1 of whether a received IR signal is valid requires, in a first step 101, the measurement of the discharge time of the capacitive element for each sequential pulse of the received and demodulated IR signal. In a second step, 102, the processor 3 establishes a discharge sequence based on the measured discharge times obtained from the IR signal and stores the discharge sequence in memory 5. In a third step, 103, the processor 3 initiates a match routine in which the processor 3 compares the established discharge sequence with each pre-determined discharge pattern of the discharge pattern library stored in memory 5.

Figure 11:
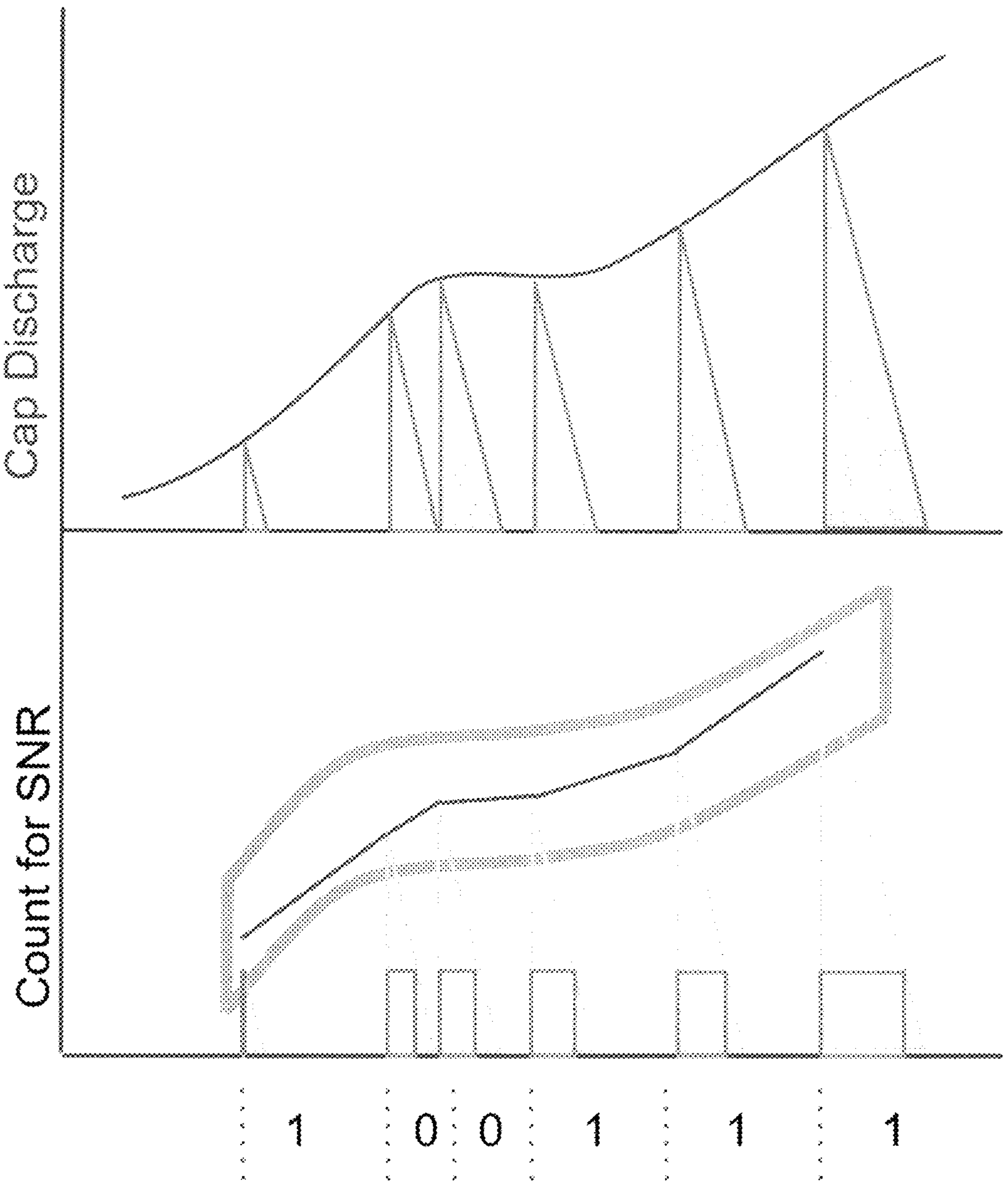
FIG. 11 shows an example of a discharge pattern match during capture of part of a valid IR signal.

Referring to FIG. 11, if the match routine finds a pattern match, the receiving device 1 determines that the IR signal is valid and that any noise-like artifacts contained in the IR signal are due to relative movement between the transmitting and receiving devices. Accordingly, in a fourth step 104, the receiving device 1 decodes the IR signal and stores the data of the IR signal in memory 5 and associates the data with a function of the target device and the corresponding button of the plurality of buttons 7 representing the desired function. A user may then be prompted by the receiving device 1 to transmit another IR signal from the transmitting device 21 with a new function of the target device for data capture and storage. It will be appreciated also that, after finding a pattern match and determining the received IR signal is valid, the receiving controller may alternatively attempt to find a matching code in the code library that may be loaded into memory for controlling the target electronic appliance.

Figure 12:
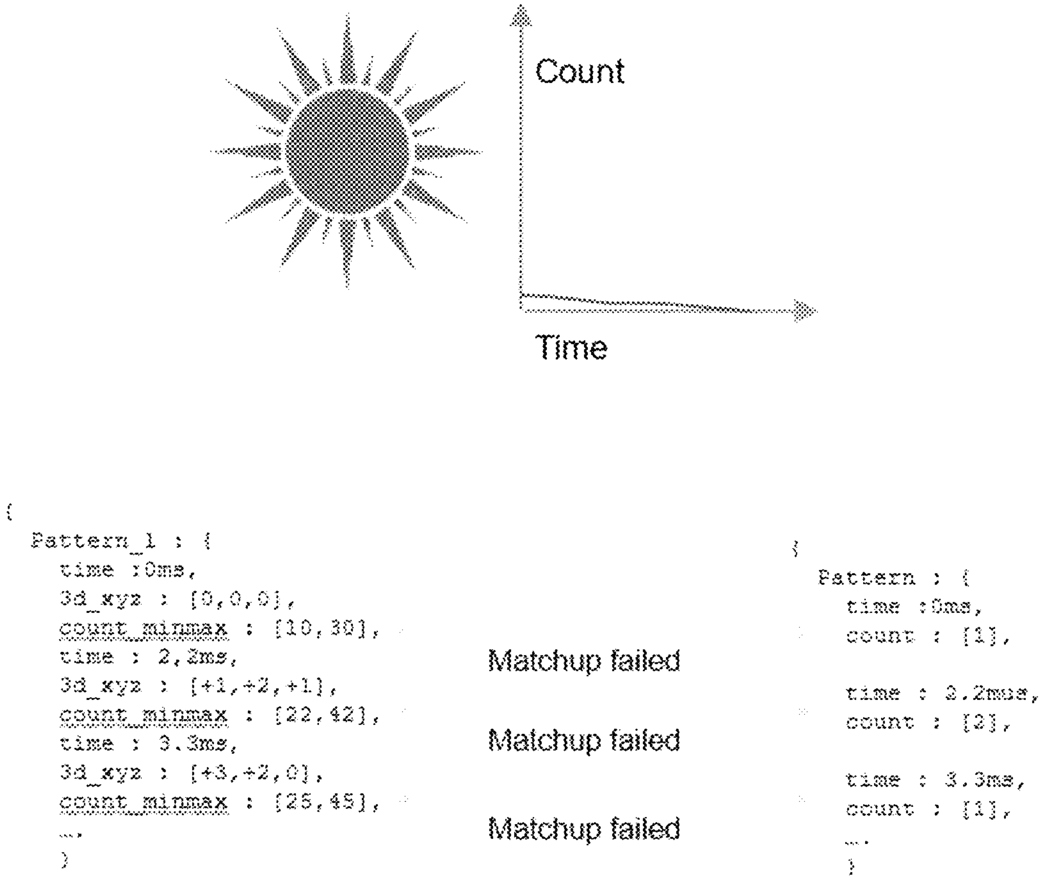
FIG. 12 shows an example of a discharge pattern mismatch of an initial three pulses of an IR signal due to IR noise from the sun.
Figure 13:
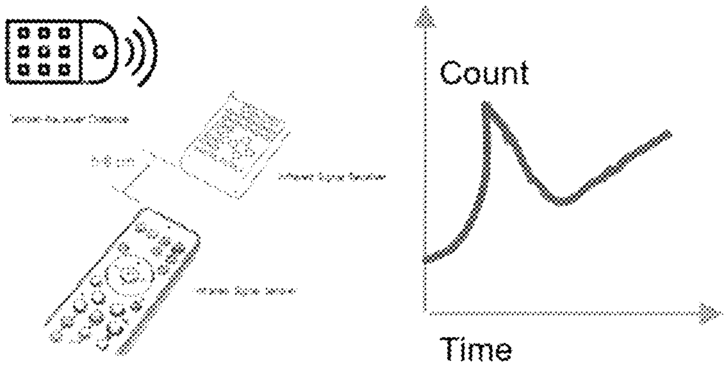
FIG. 13 shows an example of a discharge pattern mismatch of an initial three pulses of an IR signal due to IR noise from an additional IR transmitting device.

Referring to FIGS. 12 and 13, if the match routine does not find a discharge pattern match, the processor 3 of the receiving device 1 determines that the IR signal does not represent a valid signal that can be reliably stored for future control commands to a target device or reliably used to find a code match in the stored code library. For example, the discharge times of the received IR signal may be below the min discharge count for one or more pulses and relate to an IR signal emitted by an unrelated warm body such as the sun. Alternatively, the measured discharge count associated with one or more pulses may be above the max count range and likely tainted by an external IR transmitting source. Consequently, in a fifth step 105, the receiving device 1 discards the data of the received IR signal as invalid and prompts the user to re-transmit the IR signal for processing until a match is found by the match routine and a valid IR signal can be decoded and stored in memory or used to find a code match in the code library.

The above embodiment is described by way of example only. Many variations are possible without departing from the scope of the invention as defined in the appended claims.

What is claimed is:

1. A method of determining the validity of an infrared signal of a remote-control device comprising the steps of:
- receiving from the remote-control device an infrared signal comprising pulses representing data corresponding to a function of a controllable target device;
- passing the received infrared signal through a capacitor such that, for each pulse of the infrared signal, the capacitor is charged and subsequently discharged;
- measuring the capacitor discharge time associated with each pulse of the infrared signal to establish a discharge sequence;
- comparing the established discharge sequence with a plurality of pre-determined valid discharge patterns; and
- determining the validity of the received infrared signal based on the outcome of the comparison of the established discharge sequence with the plurality of pre-determined discharge patterns.

2. The method of claim 1, further comprising the steps of decoding the infrared signal and storing the decoded data of the infrared signal in memory upon finding a match between the established discharge sequence and a pre-determined valid discharge pattern of the plurality of pre-determined valid discharge patterns.

3. The method of claim 1, further comprising the step of prompting a user to retransmit the infrared signal of the remote-control device upon failing to find a match between the discharge sequence and a pre-determined valid discharge pattern of the plurality of pre-determined valid discharge patterns.

4. The method of claim 1, further comprising the step of demodulating the infrared signal before passing the infrared signal through the capacitor.

5. The method of claim 1, wherein each pre-determined valid discharge pattern of the plurality of pre-determined valid discharge patterns comprises a range of valid discharge times corresponding to each pulse of the received infrared signal, and wherein the step of determining the validity of the received infrared signal comprises comparing each discharge time of the established discharge sequence with the range of valid discharge times of the corresponding pulse of each pre-determined valid discharge pattern of the plurality of pre-determined valid discharge patterns.

6. Apparatus for determining the validity of an infrared signal of a remote-control device comprising
- a receiving device for receiving the infrared signal of the remote-control device, the infrared signal comprising a plurality of pulses representing data corresponding to a function of a controllable target device,
- a capacitor for measuring the discharge time associated with each pulse of the infrared signal,
- a processor for establishing a discharge sequence based on the measured discharge times,
- a memory storing a plurality of pre-determined valid discharge patterns,
- wherein the processor is configured to compare the established discharge sequence with each of the plurality of pre-determined valid discharge patterns to determine the validity of the infrared signal.

7. The apparatus of claim 6, wherein the processor is further configured to decode the infrared signal and store the decoded data of the infrared signal in memory upon finding a match between the established discharge sequence and a pre-determined valid discharge pattern of the plurality of pre-determined valid discharge patterns.

8. The apparatus of claim 6, wherein the processor is further configured to prompt a user to retransmit the infrared signal of the remote-control device upon failing to find a match between the discharge sequence and a pre-determined valid discharge pattern of the plurality of pre-determined valid discharge patterns.

9. The apparatus of claim 6, further comprising a demodulator configured to demodulate the infrared signal before passing the infrared signal through the capacitor.

10. The apparatus of claim 6, wherein each pre-determined valid discharge pattern of the plurality of pre-determined valid discharge patterns comprises a range of valid discharge times corresponding to each pulse of the received infrared signal, and wherein the processor is configured to compare each discharge time of the established discharge sequence with the range of valid discharge times of the corresponding pulse of each pre-determined valid discharge pattern of the plurality of pre-determined valid discharge patterns.

11. A method of storing a valid discharge sequence related to an infrared signal transmitted by a remote-control device, the infrared signal comprising a plurality of pulses representing data corresponding to a function of a controllable target device, the method comprising the steps of:

moving the remote-control device relative to an infrared receiver;

transmitting the infrared signal from the remote-control device to the infrared receiver to capture each pulse of the infrared signal;

demodulating the infrared signal;

passing the demodulated signal through a capacitor such that the capacitor charges and discharges for each pulse of the demodulated signal;

measuring the discharge time associated with each pulse of the demodulated signal; and storing, in memory, each consecutive discharge time of the demodulated signal as a sequence of discharge times.

12. The method of claim 11, further comprising the step of storing one or more additional discharge sequences for the same infrared signal.

13. The method of claim 11, further comprising the step of establishing a valid discharge pattern based on the or each stored sequence of discharge times.

14. The method of claim 11, wherein a valid discharge pattern comprises a range of valid discharge times associated with each pulse of the infrared signal.

* * * * *